US011904393B1

United States Patent
Hecht (10) Patent No.: US 11,904,393 B1
(45) Date of Patent: Feb. 20, 2024

(54) EXTERNAL GROOVING INSERT HOLDER HAVING UPPER AND LOWER JAWS CONNECTED BY ANGLED HINGE PORTION WITH COOLING CHANNEL EXTENDING THROUGH HINGE PORTION, AND CUTTING TOOL

(71) Applicant: ISCAR, LTD., Tefen (IL)

(72) Inventor: Gil Hecht, Nahariya (IL)

(73) Assignee: Iscar, Ltd., Tefen (IL)

( * ) Notice: Subject to any disclaimer, the term of this patent is extended or adjusted under 35 U.S.C. 154(b) by 0 days.

(21) Appl. No.: 17/890,389

(22) Filed: Aug. 18, 2022

(51) Int. Cl.
*B23B 29/04* (2006.01)
*B23B 27/10* (2006.01)
*B23B 27/04* (2006.01)
*B23B 27/16* (2006.01)

(52) U.S. Cl.
CPC .......... *B23B 27/1603* (2013.01); *B23B 27/10* (2013.01); *B23B 27/04* (2013.01); *B23B 29/043* (2013.01); *B23B 29/046* (2013.01); *B23B 2205/02* (2013.01)

(58) Field of Classification Search
CPC .............. B23B 27/002; B23B 2205/02; B23B 27/1603; B23B 27/10; B23B 27/04; B23B 29/043; B23B 29/06
See application file for complete search history.

(56) References Cited

U.S. PATENT DOCUMENTS

| | | | |
|---|---|---|---|
| 6,186,704 B1 * | 2/2001 | Hale | B23B 29/043 407/107 |
| 6,261,032 B1 | 7/2001 | Duwe et al. | |
| 6,582,163 B2 | 6/2003 | Hansson et al. | |

(Continued)

FOREIGN PATENT DOCUMENTS

| | | | | |
|---|---|---|---|---|
| DE | 102019116864 A1 * | 12/2020 | | B23B 27/086 |
| EP | 1524053 A2 * | 4/2005 | | B23B 29/046 |
| JP | 2001-62608 A | 3/2001 | | |

OTHER PUBLICATIONS

International Search Report dated Nov. 21, 2023, issued in PCT counterpart application No. PCT/IL2023/050752.

(Continued)

*Primary Examiner* — Sara Addisu
(74) *Attorney, Agent, or Firm* — Womble Bond Dickinson (US) LLP (57) ABSTRACT

An insert holder has a holder longitudinal axis defining opposite forward to rearward directions, a holder end surface located at a forward end thereof, and a holder peripheral surface extending circumferentially about the holder longitudinal axis. The insert holder has upper and lower jaws which are spaced apart by a clamping recess recessed in the holder end surface. The upper jaw is resiliently movable with respect to the lower jaw upon rotation around an angled pivot axis. The insert holder includes a forwardly located insert mounting portion which includes a forwardly protruding clamping finger and a forwardly protruding support rib. The clamping recess is defined partially by an elongated recess hinge surface formed on an angled hinge portion. The recess hinge surface includes a first hinge end and a second hinge end, longitudinally spaced apart from one another. The second hinge end is located forward of the first hinge end.

20 Claims, 5 Drawing Sheets

(56) References Cited

U.S. PATENT DOCUMENTS

| | | | | |
|---|---|---|---|---|
| 7,246,974 | B2* | 7/2007 | Hansson | B23B 27/04 409/107 |
| 8,104,999 | B2* | 1/2012 | Hecht | B23B 27/04 407/113 |
| 8,388,268 | B2 | 3/2013 | Henry et al. | |
| 8,827,598 | B2* | 9/2014 | Henry | B23B 27/10 407/11 |
| 9,346,103 | B2* | 5/2016 | Luik | B23B 29/043 |
| 9,468,976 | B2* | 10/2016 | Schaefer | B23B 29/043 |
| 9,908,180 | B2 | 3/2018 | Kaufmann et al. | |
| 10,556,272 | B2 | 2/2020 | Noureddine | |
| 2008/0124180 | A1* | 5/2008 | Breisch | B23B 29/043 408/713 |
| 2009/0016830 | A1 | 1/2009 | Nicholas | |
| 2010/0178116 | A1 | 7/2010 | Watanabe et al. | |
| 2012/0230780 | A1* | 9/2012 | Henry | B23B 27/10 407/11 |
| 2013/0236256 | A1* | 9/2013 | Kaufmann | B23B 29/043 407/120 |
| 2014/0064862 | A1* | 3/2014 | Breisch | B23B 27/1666 407/11 |
| 2014/0099168 | A1* | 4/2014 | Schaefer | B23B 29/043 407/11 |
| 2014/0321926 | A1 | 10/2014 | Sadikov | |
| 2018/0133806 | A1 | 5/2018 | Son et al. | |
| 2019/0084051 | A1* | 3/2019 | Noureddine | B23B 27/04 |
| 2019/0210115 | A1* | 7/2019 | Jansson | B23B 29/06 |
| 2020/0180040 | A1* | 6/2020 | Andoh | B23B 27/10 |
| 2020/0298325 | A1* | 9/2020 | Athad | B23B 29/043 |
| 2021/0220921 | A1* | 7/2021 | Luik | B23B 27/10 |
| 2021/0394278 | A1* | 12/2021 | Thabit | B23B 27/10 |

OTHER PUBLICATIONS

Written Opinion dated Nov. 21, 2023, issued in PCT counterpart application No. PCT/IL2023/050752.

* cited by examiner

EXTERNAL GROOVING INSERT HOLDER HAVING UPPER AND LOWER JAWS CONNECTED BY ANGLED HINGE PORTION WITH COOLING CHANNEL EXTENDING THROUGH HINGE PORTION, AND CUTTING TOOL

FIELD OF THE INVENTION

The subject matter of the present application relates to external grooving insert holders, and in particular to such insert holders having a lower jaw and a resilient upper jaw, and further in particular to such upper jaws and lower jaws having a clamping finger and a support rib, respectively, and yet further in particular, to such a clamping finger having a coolant outlet on the clamping finger to direct coolant towards the cutting zone from above.

BACKGROUND OF THE INVENTION

Cutting tools for external grooving cutting operations on a workpiece can include an insert holder, and a cutting insert releasably and resiliently clamped in an insert receiving pocket. The insert holder can include upper and lower jaws spaced apart by a clamping recess and connected by a hinge portion. The upper jaw is resiliently movable with respect to the lower jaw. The insert receiving pocket is located in the clamping recess. The insert receiving pocket can include a clamping finger and a support rib formed on the upper and lower jaws, respectively, forming part of the insert receiving pocket.

The insert holder can include a coolant channel extending from the lower jaw to the upper jaw for providing coolant to a cutting zone from above.

The cutting insert can be secured in the insert receiving pocket in a "grip" manner. That is to say, the lower jaw and upper jaw resiliently clamp the cutting insert without the need of an additional element, such as a screw, to urge the upper jaw towards the lower jaw. An example of such an insert holder is disclosed in, for example, U.S. Pat. No. 10,556,272 BB, where the coolant channel extends through the hinge portion.

Alternatively, the lower jaw and upper jaw can be urged together with an additional element, such as a screw, to increase clamping forces on the cutting insert. An example of such an insert holder is disclosed in U.S. Pat. No. 9,908,180 B2. Like U.S. Pat. No. 10,556,272 BB, the coolant channel extends through the hinge portion. The cross-sectional dimension of the coolant channel (through the hinge portion) is limited by the thickness (in the axial direction of the insert holder) of the hinge portion. Another example is disclosed in, for example, U.S. Pat. No. 8,388,268 B2, where the coolant channel extends through the additional clamping screw.

It is an object of the subject matter of the present application to provide an improved external grooving insert holder having an insert mounting portion with a coolant outlet on a clamping finger to direct coolant towards the cutting zone from above.

SUMMARY OF THE INVENTION

In accordance with a first aspect of the subject matter of the present application there is provided an elongated insert holder, having a holder longitudinal axis defining opposite forward to rearward directions, the insert holder comprising:

a holder end surface, formed at a forward end of the insert holder and intersected by the holder longitudinal axis;

a holder peripheral surface extending circumferentially about the holder longitudinal axis and comprising a pocket near side holder surface and a pocket far side holder surface;

a shank portion and an insert mounting portion located at a forward end of the shank portion;

upper and lower jaws which are spaced apart by a clamping recess recessed in the holder end surface, the upper jaw being resiliently movable with respect to the lower jaw upon rotation around an angled pivot axis; and a forwardly protruding clamping finger and a forwardly protruding support rib located on the upper and lower jaws, respectively; and an insert receiving pocket extending along a pocket longitudinal axis and configured to receive a cutting insert therein, the insert receiving pocket being formed in the clamping recess and defined, at least partially, by pocket upper and lower surfaces formed on the upper and lower jaws, respectively, and extending onto the clamping finger and support rib, respectively, to define a pocket front opening;

wherein:

the insert receiving pocket opens out to the pocket near side holder surface;

the resilient upper jaw and the lower jaw are connected by an angled hinge portion;

the clamping recess is defined partially by an elongated recess hinge surface formed on the angled hinge portion, between the upper and lower jaws;

the elongated recess hinge surface comprises a first hinge end and a second hinge end, longitudinally spaced apart from one another along the holder longitudinal axis; and the second hinge end is located forward of the first hinge end.

In accordance with a second aspect of the subject matter of the present application there is provided a cutting tool comprising an insert holder of the type described above and a cutting insert, releasably and resiliently clamped in the insert receiving pocket.

It is understood that the above-said is a summary, and that features described hereinafter may be applicable in any combination to the subject matter of the present application, for example, any of the following features may be applicable to the insert holder or cutting tool:

The holder peripheral surface can further comprise opposite upper and lower holder surfaces which connect the pocket near and far side holder surfaces. The upper holder surface can comprise a shank upper surface, a mounting portion upper surface and an upper jaw rear surface extending therebetween, the upper jaw rear surface facing in the opposite direction to the holder end surface.

The upper jaw rear surface can extend between the pocket near and far side holder surfaces.

The second hinge end can be located forward of the upper jaw rear surface.

The first hinge end can be located rearward of the upper jaw rear surface.

The first hinge end can intersect the pocket near side holder surface. The second hinge end can intersect the holder end surface or the pocket far side holder surface.

The first hinge end can intersect the pocket near side holder surface and the second hinge end can intersects the pocket far side holder surface.

The recess hinge surface can extend linearly in a direction between the first and second hinge ends. In a top view of the insert holder, the angled pivot axis can form an acute hinge angle with the holder longitudinal axis, the acute hinge angle being preferably greater or equal to 45° and less than or equal to 80°.

The insert holder can comprise a coolant channel extending from the lower jaw to the upper jaw through the angled hinge portion.

The coolant channel can comprise a channel vertical portion. The channel vertical portion can extend from the lower jaw to the upper jaw through the angled hinge portion.

The pocket lower surface can comprise a pocket lower clamping surface. The pocket upper surface can comprise a pocket upper clamping surface which faces mutually towards the pocket lower clamping surface. The insert receiving pocket can comprise a pocket stopper surface formed at one of the pocket upper and lower surfaces, facing generally towards the pocket front opening, for positioning the cutting insert in a predefined axial position.

The pocket stopper surface can be located rearward of a portion of the holder end surface laterally adjacent the insert receiving pocket.

The pocket stopper surface can be formed at the pocket lower surface.

The pocket upper and lower clamping surfaces can be formed entirely on the clamping finger and the support rib, respectively.

The insert holder can further comprise a resilience slot formed in the clamping recess and extending rearwardly and towards the pocket far side holder surface from the insert receiving pocket.

The upper jaw can be devoid of a through hole opening out to the clamping recess and the holder peripheral surface.

The upper jaw can comprise a through hole opening out to the clamping recess and the holder peripheral surface.

The cutting insert can be longitudinally elongated in a direction defining an insert longitudinal axis and can comprise two opposing insert end surfaces and an insert peripheral surface extending therebetween, the insert peripheral surface extending circumferentially about the insert longitudinal axis and comprising opposing insert upper and lower surfaces and two opposing insert side surfaces which all connect the two insert end surfaces and a cutting edge formed at the intersection of the insert upper surface and a first of the two insert end surfaces. the insert lower surface can comprise an insert lower abutment surface. The insert upper surface can comprise an insert upper abutment surface which mutually faces away from the at least one insert lower abutment surface. A second of the two the insert end surfaces can comprise an insert stopper surface.

The pocket stopper surface can abut the insert stopper surface. The pocket lower clamping surface can abut the insert lower abutment surfaces. The pocket upper clamping surface can abut the insert upper abutment surface.

BRIEF DESCRIPTION OF THE FIGURES

For a better understanding of the present application and to show how the same may be carried out in practice, reference will now be made to the accompanying drawings, in which.

It will be appreciated that for simplicity and clarity of illustration, elements shown in the figures have not necessarily been drawn to scale. For example, the dimensions of some of the elements may be exaggerated relative to other elements for clarity, or several physical components may be included in one functional block or element. Where considered appropriate, reference numerals may be repeated among the figures to indicate corresponding or analogous elements.

DETAILED DESCRIPTION OF THE INVENTION

In the following description, various aspects of the subject matter of the present application will be described. For purposes of explanation, specific configurations and details are set forth in sufficient detail to provide a thorough understanding of the subject matter of the present application. However, it will also be apparent to one skilled in the art that the subject matter of the present application can be practiced without the specific configurations and details presented herein.

Figure 1:
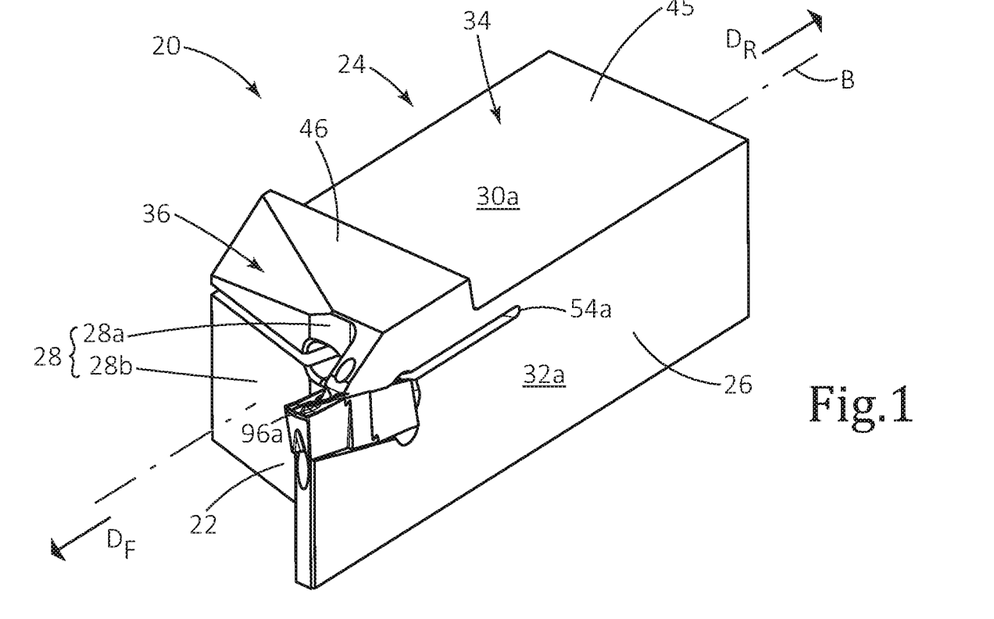
FIG. 1 is a perspective view of a cutting tool.
Figure 2:
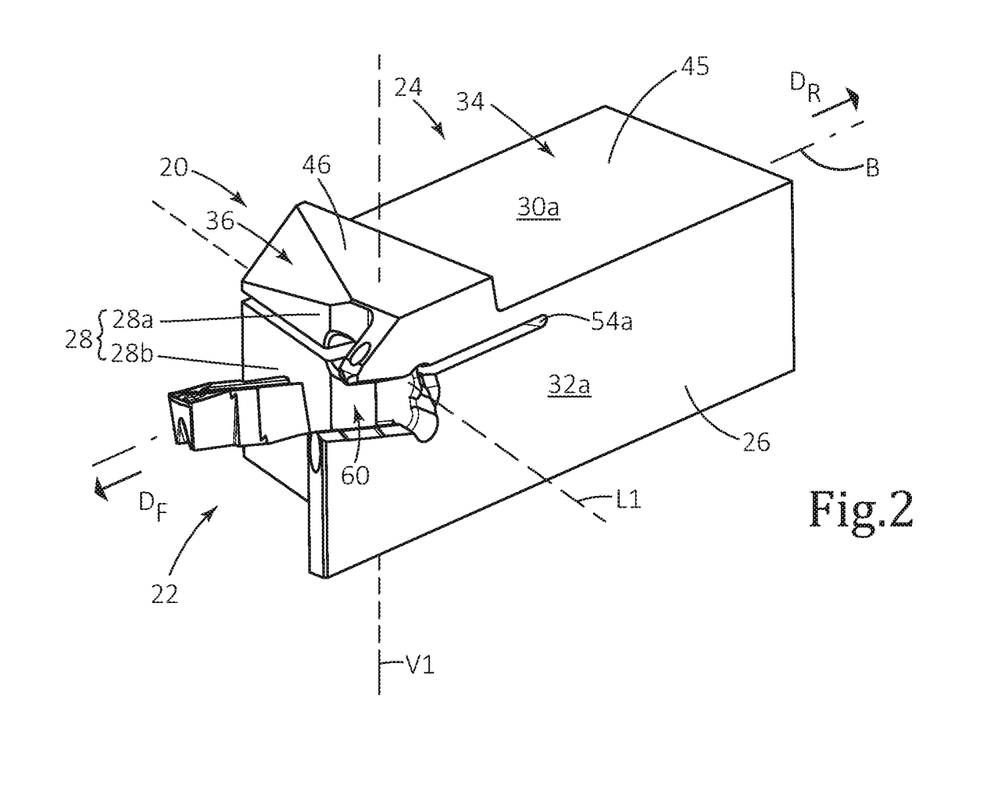
FIG. 2 is an exploded view of the cutting tool shown in FIG. 1.

Attention is first drawn to FIG. 1 showing a cutting tool 20, for chip removal, in accordance with embodiments of the subject matter of the present application. The cutting tool 20 has a cutting insert 22 which can be typically made from cemented carbide. The cutting tool 20 also has an insert holder 24 which can be typically made from steel. The cutting tool 20 is an external grooving tool and the cutting insert 22 is a grooving insert. The cutting tool 20 is adjustable between a released position and a fastened position. In the fastened position of the cutting tool 20, the cutting insert 22 is releasably attached to the insert holder 24.

Figure 9:
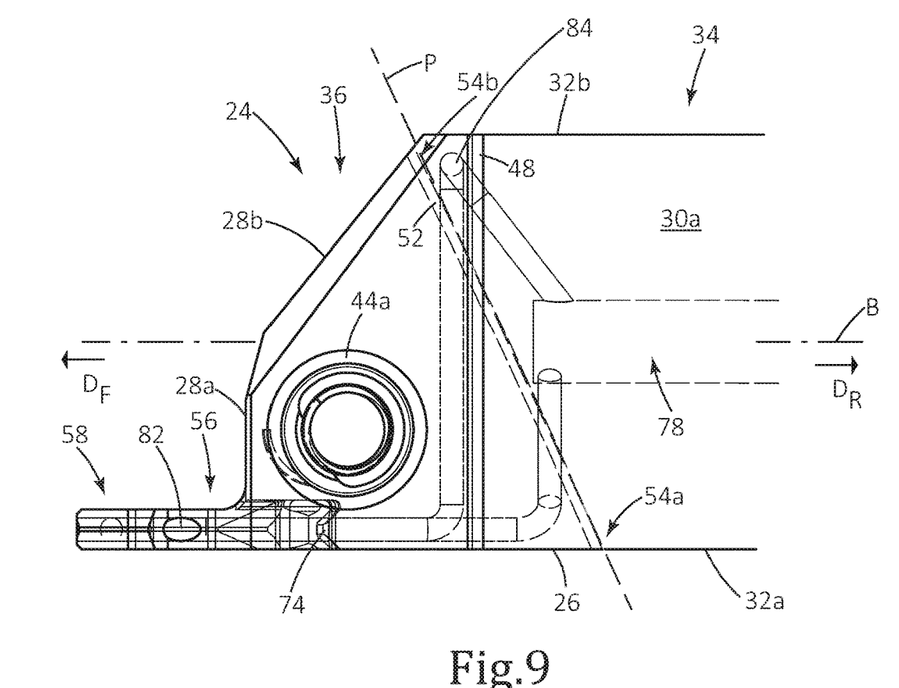
FIG. 9 is a top view of the insert holder shown in FIG. 8.

Attention is drawn now to FIG. 2-7 showing an insert holder 24 in accordance with the present application. The insert holder 24 is elongated along a holder longitudinal axis B that defines opposite forward to rearward directions DF, DR. The insert holder 24 includes a holder peripheral surface 26 that extends circumferentially along the holder longitudinal axis B. The holder peripheral surface 26 intersects, and forms a boundary of, a holder end surface 28 at a forward end of the insert holder 24. The holder longitudinal axis B can intersect the holder end surface 28. It should be appreciated that use of the terms "forward" and "rearward" throughout the description and claims refer to a relative position in a direction of the holder longitudinal axis B towards the left and right, respectively, in FIGS. 5, 7 and 9.

The holder peripheral surface 26 includes pocket near and far side holder surfaces 32*a*, 32*b*. The pocket near and far side holder surfaces 32*a*, 32*b* are opposite each other. In accordance with some embodiments of the subject matter of the present application, the holder peripheral surface 26 can include opposite upper and lower holder surfaces 30a, 30b. The pocket near and far side holder surfaces 32a, 32b connect the upper and lower holder surfaces 30a, 30b. It is noted that in a front end view of the insert holder 24 (i.e., FIG. 4), the pocket near side holder surface 32a is located on the right hand side of the insert holder 24 and the pocket far side holder surface 32b is located on the left hand side of the insert holder 24.

In accordance with some embodiments of the subject matter of the present application, the holder end surface 28 can be multi-faceted having a plurality of sub-surfaces facing in different directions. In this non-limiting example shown in the drawings, the holder end surface 28 can include first and second holder end sub-surfaces 28a, 28b. The first and second holder end sub-surfaces 28a, 28b can be adjacent (i.e. adjoin) each other. The first holder end sub-surface 28a can be oriented perpendicular to the holder longitudinal axis B. The first holder end sub-surface 28a can be located between the pocket near side holder surface 32a and the second holder end sub-surface 28a. The second holder end sub-surface 28b can slope rearwardly as it extends from the first holder end sub-surface 28a towards the pocket far side holder surface 32b. The second holder end sub-surface 28b can be located between the pocket far side holder surface 3ba and the first holder end sub-surface 28a. The second holder end sub-surface 28b can be adjacent the pocket far side holder surface 32b.

The insert holder 24 includes a shank portion 34 and an insert mounting portion 36 located at a forward end of the shank portion 34. Both the shank portion 34 and the insert mounting portion 36 are defined circumferentially by the holder peripheral surface 26. In accordance with some embodiments of the subject matter of the present application, the shank portion 34 and the insert mounting portion 36 can be integrally formed together to have unitary one-piece construction. That is to say, the insert holder 24 is devoid of a separate adaptor of the type disclosed in U.S. Pat. No. 5,833,403.

Figure 3:
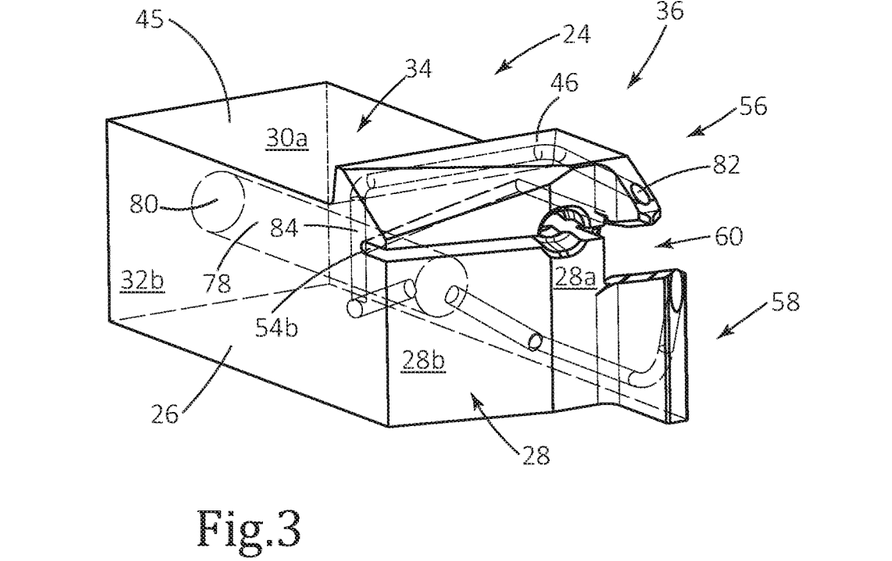
FIG. 3 is another perspective view of an insert holder shown in FIG. 2, showing a hidden clamping recess and coolant channel, in accordance with a first embodiment.

As seen in FIG. 3, the insert holder 24 includes an upper jaw 38 and a lower jaw 40. In accordance with some embodiments of the subject matter of the present application, the upper and lower jaws 38, 40 can be integrally formed together to have unitary one-piece construction.

Figure 4:
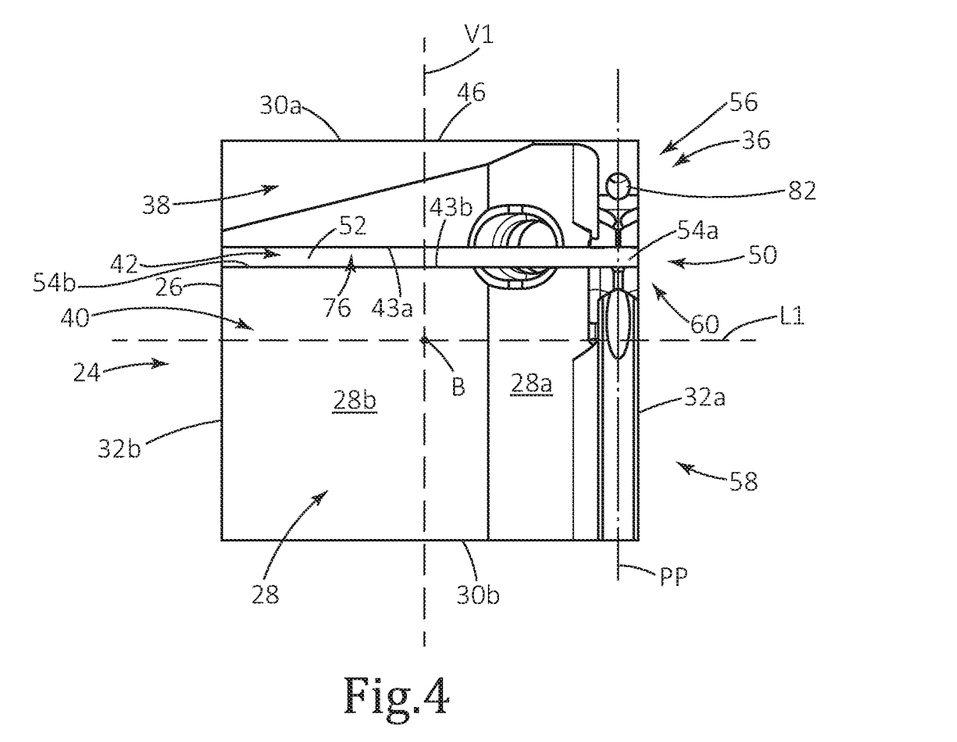
FIG. 4 is a front end view of an insert mounting portion shown in FIG. 3.

Referring to FIG. 4, the upper and lower jaws 38, 40 are spaced apart by a clamping recess 42. The clamping recess 42 is recessed in the holder end surface 28. By virtue of the foregoing configuration the insert holder 24 has a bifurcated form.

Figure 5:
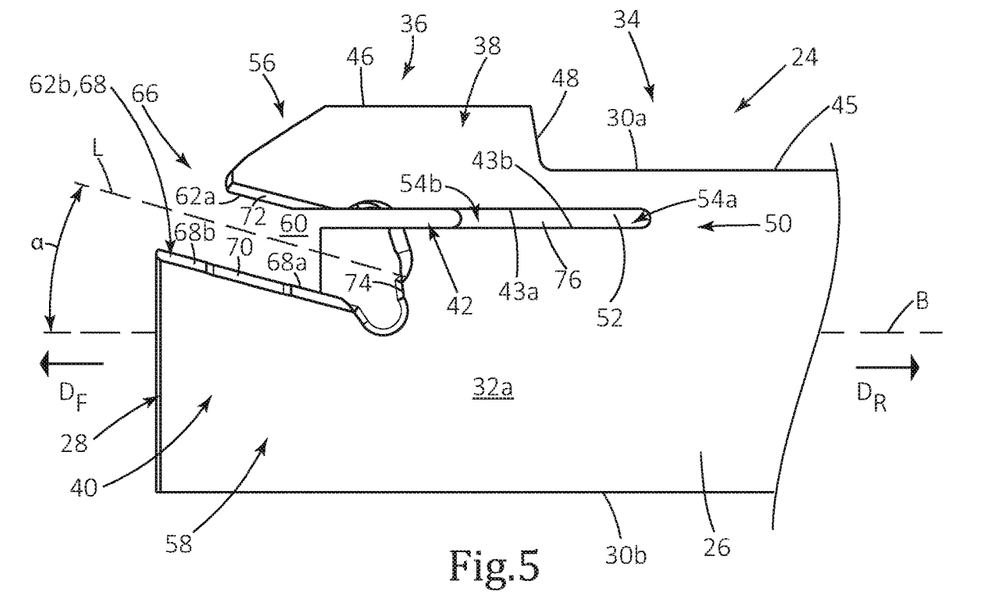
FIG. 5 is a first side view of the insert mounting portion shown in FIG. 3.

Referring in particular to FIGS. 4 and 5, in accordance with some embodiments of the subject matter of the present application, the clamping recess 42 can be defined at least by opposite recess upper and lower surfaces 43a, 43b formed on the upper and lower jaws 38, 40, respectively. The recess upper and lower surfaces 43a, 43b face each other.

Figure 7:
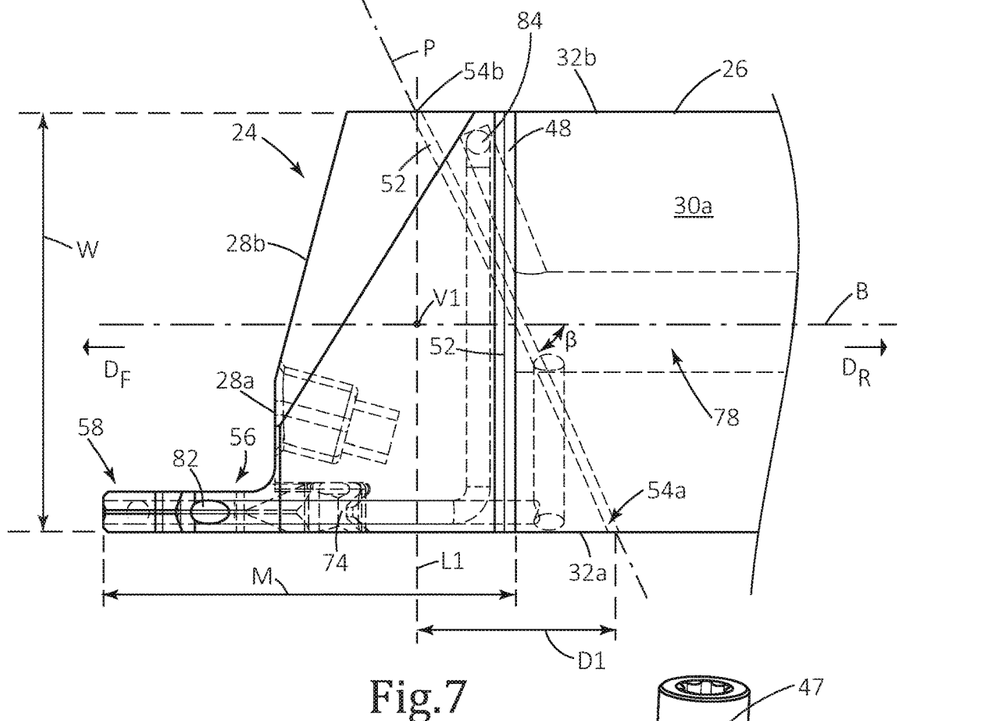
FIG. 7 is a top view of the insert holder shown in FIG. 3.
Figure 8:
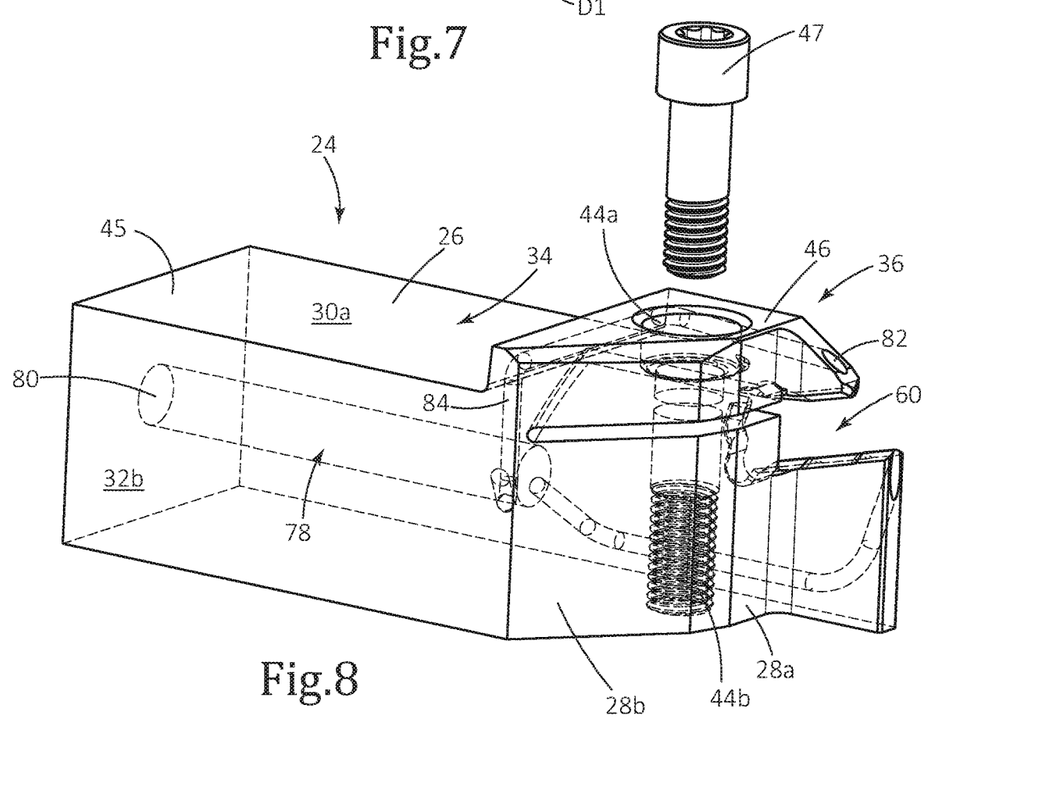
FIG. 8 is a perspective view of the insert holder, in accordance with a second embodiment, showing the hidden clamping recess and coolant channel.

The upper jaw 38 is resiliently movable with respect to the lower jaw 40 upon rotation around an angled pivot axis P. As seen in FIG. 7, in accordance with some embodiments of the subject matter of the present application, the angled pivot axis P can be non-perpendicular to the holder longitudinal axis B. In accordance with a first embodiment of the subject matter of the present application, the upper jaw 38 can be configured to resiliently clamp the cutting insert 22 without the use of an additional, separate clamping device, such as a clamping screw or other fastener. That is to say, the upper and lower jaws 38, 40 can independently grip the cutting insert 22. Thus, the upper jaw 38 is devoid of a through hole which opens out to the clamping recess 42 and the holder peripheral surface 26 (specifically the upper holder surface 30a), for receiving a clamping screw. Alternatively, referring to FIG. 8 and FIG. 9, in accordance with a second embodiment of the subject matter of the present application, the upper jaw 38 can include a through hole 44a which opens out to the recess lower surface 43a and the holder peripheral surface 26 (specifically the upper holder surface 30a), for a clamping screw 47. The lower jaw 40 can include a threaded hole 44b which opens out to the recess lower surface 43b, for threading engagement with the clamping screw 47.

The insert holder 36 can have a "turret" basic shape. Specifically, in accordance with some embodiments of the subject matter of the present application, the upper holder surface 30a can include a shank upper surface 45, a mounting portion upper surface 46 and an upper jaw rear surface 48 which extends therebetween. The upper jaw rear surface 48 can face in the opposite direction to the holder end surface 28 (i.e., faces in the rearward direction DR) and can be oriented transversely to the shank upper surface 45 and the mounting portion upper surface 46. The upper jaw rear surface 48 can extend between the pocket near and far side holder surfaces 32a, 32b. The upper jaw rear surface 48 can delimit the shank portion 34 from the insert mounting portion 36. The upper jaw rear surface 48 can define the upper jaw 38 in the rearward direction DR. It is noted that such a configuration can restrict the volume of the insert holder 24 in the vicinity rearward of the clamping recess 42 (i.e., at an angled hinge portion as described below), thus precluding the provision of a coolant channel, in particularly when the coolant channel extends vertically.

As seen in the figures, the insert holder 24 has a holder vertical axis V1 which passes through the upper and lower holder surfaces 30a, 30b at the insert mounting portion 36. The holder vertical axis may be perpendicular to, and intersect, the holder longitudinal axis B. The insert holder 24 also has a holder lateral axis L1 which passes through the pocket near and far side holder surfaces 32a, 32b. The holder lateral axis L1 may be perpendicular to, and intersect, both the holder longitudinal axis B and the holder vertical axis V1. The insert mounting portion 36 has a mounting portion width W which is measured along the lateral axis L1, as seen in FIG. 7.

Referring to FIGS. 4 and 5, the resilient upper jaw 38 and the lower jaw 40 are connected by an angled hinge portion 50. The clamping recess 42 is defined partially by an elongated recess hinge surface 52 formed on the angled hinge portion 50, between the upper and lower jaws 38, 40. Specifically, the recess hinge surface 52 extends extend between the recess upper and lower surfaces 43a, 43b. The recess hinge surface 52 extends longitudinally along the angled pivot axis P. In accordance with some embodiments of the subject matter of the present application, the recess hinge surface 52 can be concavely curved between the recess upper and lower surfaces 43a, 43b.

The elongated recess hinge surface 52 includes a first hinge end 54a and a second hinge end 54b longitudinally spaced apart from the first hinge end 54a. In accordance with some embodiments of the subject matter of the present application, the recess hinge surface 52 can extend linearly in a direction between the first and second hinge ends 54a, 54b. Thus, in a top view of the insert holder 24, normal to the upper holder surface 30a (i.e., FIG. 7), the (hidden) recess hinge surface 52 can be straight.

As also seen in the top view, the angled pivot axis P forms an acute hinge angle $\beta$ with the holder longitudinal axis B as the elongated recess hinge surface 52 extends between the pocket near side holder surface 32a and the pocket far side holder surface 32b. In some non-limiting embodiments, the acute hinge angle β may be between 45° and 80°.

In accordance with some embodiments of the subject matter of the present application, the first hinge end 54a can be located rearward of the upper jaw rear surface 48. Thus, the clamping recess 42 can extend rearwardly into the shank portion 34 (and the upper and lower jaws 38, 40 are partly located in the shank portion 34). The first hinge end 54a can intersect the upper jaw rear surface 48 or the pocket near side holder surface 32a.

The second hinge end 54b is located forward of the first hinge end 54a, thereby forming an angled hinged portion. As seen best in FIGS. 3 and 7, advantageously, this allows for the placement of a coolant channel through the angled hinge portion 50, without enlarging the angled hinge portion 50 by locating the upper jaw rear surface 48 further rearwardly. Thus, the insert mounting portion's overhang can be shortened, thereby improving the lifespan and performance of the cutting tool. In accordance with some embodiments of the subject matter of the present application, the second hinge end 54b can be located forward of the upper jaw rear surface 48. The second hinge end 54b can intersect the holder end surface 28 or the pocket far side holder surface 32b.

In accordance with the first embodiment of the subject matter of the present application, the first hinge end 54a can intersect the pocket near side holder surface 32a and the second hinge end 54b can intersect the pocket far side holder surface 32b. In such a configuration, the clamping recess 42 opens out to the pocket near side holder surface 32a, the holder end surface 28 and the pocket near side holder surface 32a.

As seen in FIG. 7, the first hinge end 54a and the second hinge end 54b may be longitudinally spaced apart from one another by a hinge end longitudinal separation distance D1. The hinge end separation distance D1 may depend on a variety of other dimensions associated with the insert holder 24. In embodiments in which the first and second hinge ends 54a, 54b open out at the laterally opposite pocket near and pocket far side holder surfaces 32a, 32b, respectively, the ratio D1/W of the hinge end separation distance D1 to the mounting portion width W may fall within a predetermined range consistent with the aforementioned acute hinge angle β. In this non-limiting embodiment, the axial position of the holder lateral axis L1 (in the forward-to-rearward direction) may coincide with that of the second hinge end 54b on the pocket far side holder surface 32b.

In accordance with the second embodiments of the subject matter of the present application (see FIGS. 8 and 9), the first hinge end 54a can intersect the pocket near side holder surface 32a and the second hinge end 54b can intersect the holder end surface 28 (or more precisely, the second holder end sub-surface 28b). In such a configuration the clamping recess 42 opens out to the pocket near side holder surface 32a and the holder end surface 28.

Figure 6:
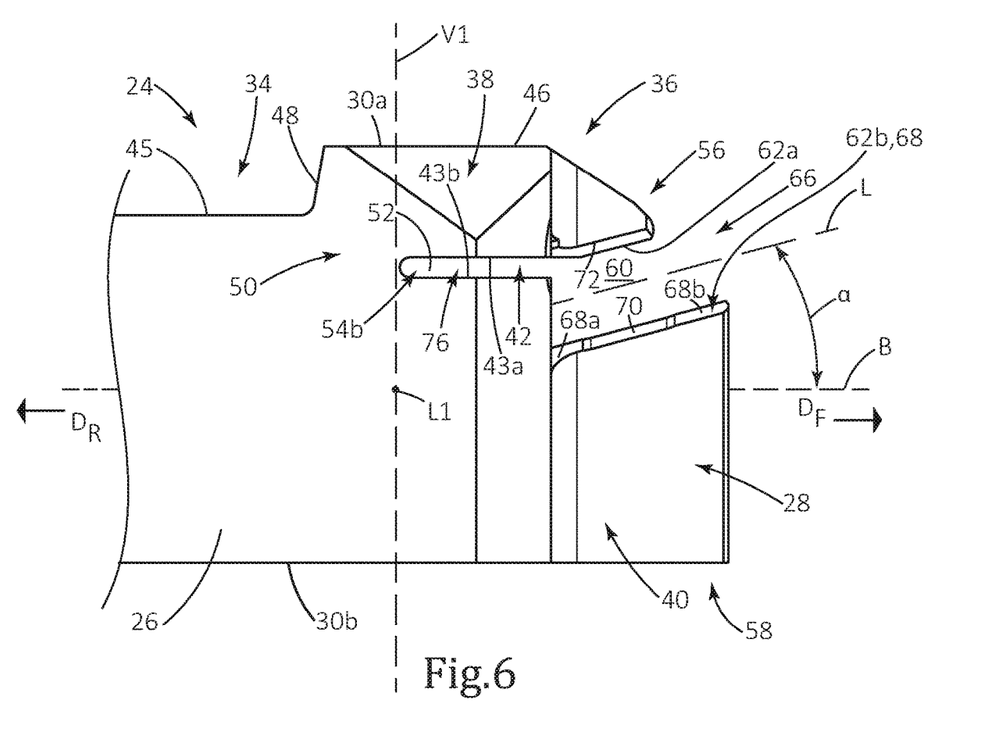
FIG. 6 is a second side view of the insert mounting portion shown in FIG. 3.

The insert holder 24 includes a forwardly protruding clamping finger 56 located on the upper jaw 38. A portion of the holder end surface 28 is located on a forward end of the clamping finger 56. The insert holder 24 also includes a forwardly protruding a forwardly protruding support rib 58 located on the lower jaw 40. The support rib 58 provides additional support to the cutting insert 22. Another portion of the holder end surface 28 is located on a forward end of the support rib 58. The clamping finger 56 and the support rib 58 are narrower than the remainder of the upper and lower jaws 38, 40, respectively. Thus, it is noted that the insert holder 24 is not in the form of a blade, as known in the art (e.g., as also disclosed in U.S. Pat. No. 9,033,622), and which are suitable for (deep) external grooving. The clamping finger 56 and the support rib 58 are also narrower than the cutting insert 22 so as not to interfere during cutting operations. As seen in FIGS. 5 and 6, in accordance with some embodiments of the subject matter of the present application, the clamping finger 56 can be shorter than the support rib 58. Referring to FIG. 7, the insert mounting portion 32 (including the support rib 58 and the clamping finger 56) has a mounting portion length M, as measured in the direction of the holder longitudinal axis B. The mounting portion length M defines the overhang of the insert mounting portion 36. The mounting portion length M may be larger than the hinge end separation distance D1 described above.

Referring to FIGS. 2-6, the insert holder 24 includes an elongated insert receiving pocket 60. The insert receiving pocket 60 is configured to receive a cutting insert 22 therein. The insert receiving pocket 60 is formed in the clamping recess 42. More specifically, the insert receiving pocket 60 is defined, at least partially, by pocket upper and lower surfaces 62a, 62b formed on the upper and lower jaws 38, 40, respectively. Even more specifically, the pocket upper and lower surfaces 62a, 62b are located on the recess upper and lower surfaces 43a, 43b, respectively. The insert receiving pocket 60 extends longitudinally along a pocket longitudinal axis L. The pocket upper and lower surfaces 62a, 62b extend in the forward direction DF onto the clamping finger 56 and support rib 58, respectively, to define a pocket front opening 66. Thus, the insert receiving pocket 60 opens out to the holder end surface 28. The pocket upper and lower surfaces 62a, 62b can be elongated. The pocket front opening 66 is of sufficient dimensions to allow insertion of the cutting insert 22 into the insert receiving pocket 60. The pocket longitudinal axis L passes between the pocket upper and lower surfaces 62a, 62b and passes through the pocket front opening 66. In accordance with some embodiments of the subject matter of the present application, the first holder end sub-surface 28a can be located laterally adjacent the insert receiving pocket 60 (or more precisely, the clamping finger 56 and the support rib 58). In a side view of the insert holder 24 (i.e., FIG. 5 or FIG. 6), the pocket longitudinal axis L can define a pocket axis angle α with respect to the holder longitudinal axis B. The pocket axis angle α can be non-zero.

The insert receiving pocket 60 also opens out to the pocket near side holder surface 32a. Stated differently, the insert receiving pocket 60 is immediately adjacent to (i.e., adjoins) the pocket near side holder surface 32a. The pocket upper and lower surfaces 62a, 62b intersect the pocket near side holder surface 32a.

In accordance with some embodiments of the subject matter of the present application, the insert receiving pocket 60 can be in the basic form of a clamping slot, suitable for receiving elongated grooving inserts of the type known in the art (e.g. as disclosed in U.S. Pat. No. 10,556,272), which permit external grooving of the workpiece to be performed. Also in some embodiments, the insert holder 24 may have only a single insert receiving pocket 60, rather than having two or more circumferentially spaced apart insert receiving pockets along its periphery, such as in a slotting cutter.

Referring to FIG. 4, in accordance with some embodiments of the subject matter of the present application, the insert receiving pocket 60 can be oriented along a pocket plane PP. The pocket plane PP contains the pocket longitudinal axis L and intersects the pocket upper and lower surfaces 62a, 62b. The pocket plane PP can be parallel to the holder longitudinal axis B.

The pocket lower surface 62b includes a pocket lower clamping surface 68. The pocket lower clamping surface 68 is for firmly clamping a corresponding surface on the cutting insert 22. In accordance with some embodiments of the subject matter of the present application, the pocket lower clamping surface 68 can extend longitudinally in a direction parallel to the pocket longitudinal axis L. The pocket lower clamping surface 68 can be formed entirely on the support rib 58.

Referring to FIGS. 5 and 6, in accordance with some embodiments of the subject matter of the present application, the pocket lower clamping surface 68 can include two pocket lower clamping sub-surfaces 68a, 68b which are spaced apart from each other along the pocket longitudinal axis L and in a direction away from the pocket front opening 66, by a lower relief recess 70 recessed in the pocket lower surface 62b. The pocket lower clamping surface 68 can be concavely v-shaped.

The pocket upper surface 62a includes a pocket upper clamping surface 72. The pocket upper clamping surface 72 is for firmly clamping a corresponding surface the cutting insert 22. The pocket upper clamping surface 72 faces mutually towards the pocket lower clamping surface 68 (i.e. the pocket upper clamping surface 72 and the pocket lower clamping surface 68 face towards each other). In accordance with some embodiments of the subject matter of the present application, the pocket upper clamping surface 72 can be concavely v-shaped. The pocket upper clamping surface 72 can be formed entirely on the clamping finger 56.

Referring to FIG. 5, the insert receiving pocket 60 includes a pocket stopper surface 74 formed at one of the pocket upper and lower surfaces 62a, 62b. The pocket stopper surface 74 is for positioning the cutting insert 22 in a predefined axial position (i.e., with respect to the pocket axis) when inserting the cutting insert 22 into the insert receiving pocket 60. It also serves to prevent inward displacement of the cutting insert 22 further into the insert receiving pocket 60 along the pocket longitudinal axis L during metal cutting operations. In accordance with some embodiments of the subject matter of the present application, the pocket stopper surface 74 can be formed at the pocket lower surface 62b.

The pocket stopper surface 74 faces generally towards the pocket front opening 66 in order to serve as a stopper. In accordance with some embodiments of the subject matter of the present application, the pocket stopper surface 74 can be oriented perpendicular to the pocket longitudinal axis L. The pocket stopper surface 74 can be planar.

Making reference to FIG. 7, in accordance with some embodiments of the subject matter of the present application, the pocket stopper surface 74 can be located rearward of a portion of the holder end surface 28 laterally adjacent the insert receiving pocket 60 (i.e., the portion adjacent the insert receiving pocket in a direction towards the pocket far side holder surface 32b). Stated differently, the pocket stopper surface 74 is closer to the shank portion 34 than the portion of the holder end surface 28 laterally adjacent the insert receiving pocket 60. By virtue of such a configuration the insert mounting portion's overhang can be shortened.

Referring to FIGS. 4-6, in accordance with some embodiments of the subject matter of the present application, the insert holder 24 can include a resilience slot 76 formed in the clamping recess 42. The resilience slot 76 is primarily designed to provide the desired flexibility to the upper jaw 38. The upper jaw 38 should be flexible enough to allow insertion of the cutting insert 22 into the insert receiving pocket 60. At the same time, the upper jaw 38 should be rigid enough to provide sufficient clamping of the cutting insert 22.

In accordance with some embodiments of the subject matter of the present application, the resilience slot 76 extends rearwardly from the holder end surface 28. The resilience slot 76 merges with the insert receiving pocket 60.

In accordance with some embodiments of the subject matter of the present application, the insert holder 24 can include a coolant channel 78 which extends from the lower jaw 40 to the upper jaw 38 through the angled hinge portion 50. The coolant channel 78 includes a channel inlet 80 and a channel outlet 82. The channel inlet and outlet 80, 82 are in fluid communication with each other. The channel outlet 82 is located on the clamping finger 56 and is configured to direct coolant towards the cutting zone. In accordance with some embodiments of the subject matter of the present application, the channel outlet 82 can be located on the upper jaw 38.

The coolant channel 78 can include a channel vertical portion 84. The channel vertical portion 84 is oriented perpendicular to the holder longitudinal axis B and extends in direction between the upper and lower holder surfaces 30a, 30b. The channel vertical portion 84 can extend from the lower jaw 40 to the upper jaw 38 through the angled hinge portion 50.

Figure 10:
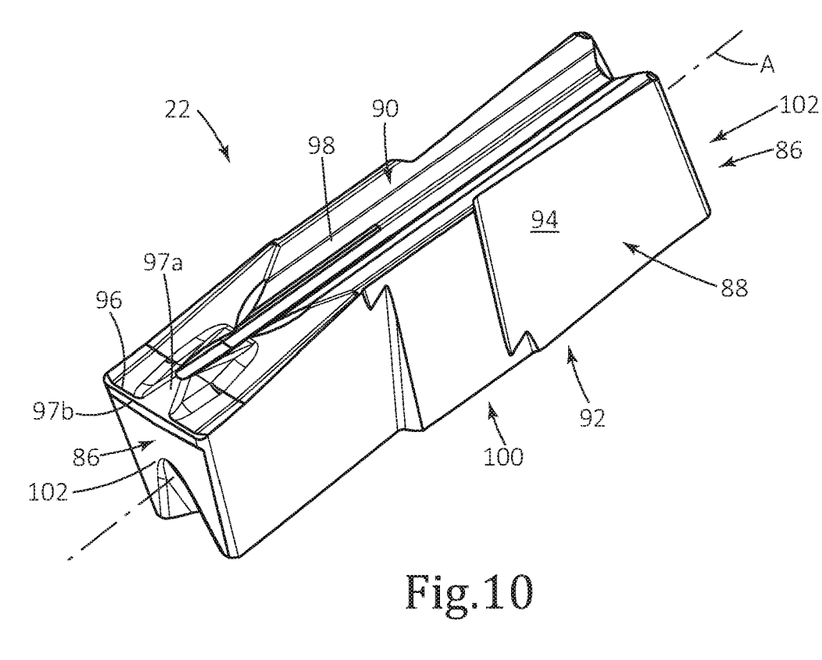
FIG. 10 is a perspective view of a cutting insert shown in FIG. 2.

Reference is now made to FIG. 10, showing the cutting insert 22. The cutting insert 22 is integrally formed to have a unitary one-piece construction. The cutting insert 22 includes two opposing insert end surfaces 86 and an insert peripheral surface 88 extending between the two insert end surfaces 86. The insert peripheral surface 88 extends circumferentially about an insert longitudinal axis A. The insert longitudinal axis A defines a length direction of the insert, i.e., the direction in which the cutting insert 22 is longitudinally elongated and has its longest dimension. The insert peripheral surface 88 includes opposing insert upper and lower surfaces 90, 92 and two opposing insert side surfaces 94 all connecting the two insert end surfaces 86. The cutting insert 22 is devoid of a through hole, for a retaining screw.

In this non-limiting example shown in the drawings, the cutting insert 22 includes two cutting edges 96 formed at the intersection of the insert upper surface 90 and the two insert end surfaces 86, respectively. Stated differently, the cutting insert 22 can be double-ended and can be two-way indexable. However, it is noted that the present invention is not limited to double-ended cutting inserts. For example, the present invention also applies to single-ended cutting inserts having a single cutting edge 96 formed at the intersection of the insert upper surface 90 and one of the insert end surface 86. A portion of the insert upper surface 90 adjacent each cutting edge 96 serves as a rake surface 97a. A portion of each insert end surface 86 adjacent a respective cutting edge 96 serves as a relief surface 97b.

The insert lower surface 92 includes at least one insert lower abutment surface 98. In accordance with some embodiments of the subject matter of the present application, the at least one insert lower abutment surface 98 can extend parallel to the insert longitudinal axis A. The insert lower surface 92 can include a single insert lower abutment surface 98 which is planar (not shown). In accordance with some other embodiments of the subject matter of the present application, the insert lower surface 92 can include two insert lower abutment surfaces 98 which are offset (i.e., spaced apart from one another) in the longitudinal direction of the cutting insert 22. Each of the insert lower abutment surfaces 98 can be convexly v-shaped, complementarily corresponding to the shape of the pocket lower clamping surface(s) 68.

The insert upper surface 90 includes an insert upper abutment surface 100. The insert upper abutment surface 100 is for abutting a corresponding surface in the insert receiving pocket 60. The insert upper abutment surface 100 face mutually away from the at least one insert lower abutment surface 98 (stated differently, the insert upper abutment surface 100 and the at least one insert lower abutment surface 98 face away from each other). The insert upper abutment surface 100 can be convexly v-shaped, complementarily corresponding to the shape of the pocket upper clamping surface 72.

At least one insert end surface 86 ran include an insert stopper surface 102. In this non-limiting example shown in the drawings, both insert end surfaces 86 can include the insert stopper surface 102. The insert stopper surface 102 is for abutting the corresponding pocket stopper surface 74 in the insert receiving pocket 60. Each insert stopper surface 102 can be planar.

Reference is now made to FIGS. 12 to 13, showing the cutting tool 20, in accordance with the subject matter of a second aspect of the present application. The cutting tool 20 includes the cutting insert 22 releasably and resiliently clamped in the insert receiving pocket 60 of the insert holder 24. The cutting edge 96 that is outermost (and proximate the pocket front opening 52a) forms an active cutting edge 96a.

In accordance with some embodiments of the subject matter of the present application, the pocket stopper surface 74 can abut the insert stopper surface 102. The pocket lower clamping surface 68 can abut one of the at least one insert lower abutment surfaces 98. The pocket upper clamping surface 72 can abut the insert upper abutment surface 100.

Although the subject matter of the present application has been described to a certain degree of particularity, it should be understood that various alterations and modifications could be made without departing from the spirit or scope of the invention as hereinafter claimed.

What is claimed is:

1. An elongated insert holder (24), having a holder longitudinal axis (B) defining opposite forward to rearward directions (DF, DR), the insert holder (24) comprising:
a holder end surface (28), formed at a forward end of the insert holder (24) and intersected by the holder longitudinal axis (B);
a holder peripheral surface (26) extending circumferentially about the holder longitudinal axis (B) and comprising a pocket near side holder surface (32a) and a pocket far side holder surface (32b);
a shank portion (34) and an insert mounting portion (36) located at a forward end of the shank portion (34);
upper and lower jaws (38, 40) which are spaced apart by a clamping recess (42) recessed in the holder end surface (28), the upper jaw (38) being resiliently movable with respect to the lower jaw (40) upon rotation around an angled pivot axis (P); and
a forwardly protruding clamping finger (56) and a forwardly protruding support rib (58) located on the upper and lower jaws (38, 40), respectively; and
an insert receiving pocket (60) extending along a pocket longitudinal axis (L) and configured to receive a cutting insert therein, the insert receiving pocket (60) being formed in the clamping recess (42) and defined, at least partially, by pocket upper and lower surfaces (62a, 62b) formed on the upper and lower jaws (38, 40), respectively, and extending onto the clamping finger (56) and support rib (58), respectively, to define a pocket front opening (66);
wherein:
the insert receiving pocket (60) opens out to the pocket near side holder surface (32a); the resilient upper jaw (38) and the lower jaw (40) are connected by an angled hinge portion (50);
the clamping recess (42) is defined partially by an elongated recess hinge surface (52) formed on the angled hinge portion (50), between the upper and lower jaws (38, 40);
the elongated recess hinge surface (52) comprises a first hinge end (54a) and a second hinge end (54b), longitudinally spaced apart from one another along the holder longitudinal axis (B); and
the second hinge end (54b) is located forward of the first hinge end (54a).

2. The insert holder (24), according to claim 1, wherein:
the holder peripheral surface (26) further comprises opposite upper and lower holder surfaces (30a, 30b) which connect the pocket near and far side holder surfaces (32a, 32b); and
the upper holder surface (30a) comprises a shank upper surface (45), a mounting portion upper surface (46) and an upper jaw rear surface (48) extending therebetween, the upper jaw rear surface (48) facing in the opposite direction to the holder end surface (28).

3. The insert holder (24), according to claim 2, wherein:
the upper jaw rear surface (48) extends between the pocket near and far side holder surfaces (32a, 32b).

4. The insert holder (24), according to claim 2, wherein:
the second hinge end (54b) is located forward of the upper jaw rear surface (48).

5. The insert holder (24), according to claim 2, wherein:
the first hinge end (54a) is located rearward of the upper jaw rear surface (48).

6. The insert holder (24), according to claim 2, wherein:
the first hinge end (54a) intersects the pocket near side holder surface (32a); and
the second hinge end (54b) intersects the holder end surface (28) or the pocket far side holder surface (32b).

7. The insert holder (24), according to claim 6, wherein:
the first hinge end (54a) intersects the pocket near side holder surface (32a) and the second hinge end (54b) intersects the pocket far side holder surface (32b).

8. The insert holder (24), according to claim 1, wherein:
the recess hinge surface (52) extends linearly in a direction between the first and second hinge ends (54a, 54b); and
in a top view of the insert holder, the angled pivot axis (P) forms an acute hinge angle ($\beta$) with the holder longitudinal axis (B), the acute hinge angle ($\beta$) satisfying $45° \leq \beta \leq 80°$.

9. The insert holder (24), according to claim 1, wherein:
the insert holder (24) comprises a coolant channel (78) extending from the lower jaw (40) to the upper jaw (38) through the angled hinge portion (50).

10. The insert holder (24), according to claim 9, wherein:
the coolant channel (78) comprises a channel vertical portion (84); and
the channel vertical portion (84) extends from the lower jaw (40) to the upper jaw (30) through the angled hinge portion (50).

11. The insert holder (24), according to claim 1, wherein:
the pocket lower surface (62b) comprises a pocket lower clamping surface (68);

the pocket upper surface (62*a*) comprises a pocket upper clamping surface (72) which faces mutually towards the pocket lower clamping surface (68);

the insert receiving pocket (60) comprises a pocket stopper surface (74) formed at one of the pocket upper and lower surfaces (62*a*, 62*b*), facing generally towards the pocket front opening (66), for positioning the cutting insert in a predefined axial position.

12. The insert holder (24), according to claim 11, wherein:
the pocket stopper surface (74) is located rearward of a portion of the holder end surface (28) laterally adjacent the insert receiving pocket (60).

13. The insert holder (24), according to claim 11, wherein:
the pocket stopper surface (74) is formed at the pocket lower surface (62*b*).

14. The insert holder (24), according to claim 1, wherein:
the pocket upper and lower clamping surfaces (72, 68) are formed entirely on the clamping finger (56) and the support rib (58), respectively.

15. The insert holder (24), according to claim 1, further comprising a resilience slot (76) formed in the clamping recess (42) and extending rearwardly and towards the pocket far side holder surface (32*b*) from the insert receiving pocket (60).

16. The insert holder (24), according to claim 1, wherein the upper jaw (34) is devoid of a through hole opening out to the clamping recess (38) and the holder peripheral surface (26).

17. The insert holder (24), according to claim 1, wherein the upper jaw (34) comprises a through hole (44*a*) opening out to the clamping recess (38) and the holder peripheral surface (26).

18. A cutting tool (20) comprising:
an insert holder (24) in accordance with claim 1; and
a cutting insert (22), releasably and resiliently clamped in the insert receiving pocket (60).

19. The cutting tool (20) according to claim 18, wherein:
the cutting insert (22) is longitudinally elongated in a direction defining an insert longitudinal axis (A) and comprises:

two opposing insert end surfaces (86) and an insert peripheral surface (88) extending therebetween, the insert peripheral surface (88) extending circumferentially about the insert longitudinal axis (A) and comprising opposing insert upper and lower surfaces (90, 92) and two opposing insert side surfaces (94) which all connect the two insert end surfaces (86); and a cutting edge (96) formed at the intersection of the insert upper surface (90) and a first of the two insert end surfaces (86); wherein:

the insert lower surface (92) comprises an insert lower abutment surface (98);

the insert upper surface (90) comprises an insert upper abutment surface (100) which mutually faces away from the at least one insert lower abutment surface (98); and a second of the two the insert end surfaces (86) comprises an insert stopper surface (102).

20. The cutting tool (20), according to claim 19, wherein:

the pocket lower surface (62*b*) comprises a pocket lower clamping surface (68);

the pocket upper surface (62*a*) comprises a pocket upper clamping surface (72) which faces mutually towards the pocket lower clamping surface (68);

the insert receiving pocket (60) comprises a pocket stopper surface (74) formed at one of the pocket upper and lower surfaces (62*a*, 62*b*), facing generally towards the pocket front opening (66), for positioning the cutting insert in a predefined axial position;

the pocket stopper surface (74) abuts the insert stopper surface (102);

the pocket lower clamping surface (68) abuts the insert lower abutment surfaces (98); and the pocket upper clamping surface (72) abuts the insert upper abutment surface (100).

\* \* \* \* \*